(12) United States Patent
Shivalinga et al.

(10) Patent No.: US 11,365,055 B2
(45) Date of Patent: Jun. 21, 2022

(54) BRAKE ROLLER WITH ONE WAY JAW CLUTCH

(71) Applicant: GOODRICH CORPORATION, Charlotte, NC (US)

(72) Inventors: Vinodkumar Shivalinga, Bangalore (IN); Manu Siddharth Paliwal, Jaipur (IN)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/108,822

(22) Filed: Dec. 1, 2020

(65) Prior Publication Data

US 2021/0078804 A1    Mar. 18, 2021

Related U.S. Application Data

(62) Division of application No. 16/506,039, filed on Jul. 9, 2019, now Pat. No. 10,882,698.

(30) Foreign Application Priority Data

May 20, 2019   (IN) .............................. 201941019743

(51) Int. Cl.
| | |
|---|---|
| *B65G 13/075* | (2006.01) |
| *F16D 11/10* | (2006.01) |
| *F16D 41/18* | (2006.01) |
| *F16D 55/39* | (2006.01) |

(52) U.S. Cl.
CPC ............ *B65G 13/075* (2013.01); *F16D 11/10* (2013.01); *F16D 41/185* (2013.01); *F16D 55/39* (2013.01)

(58) Field of Classification Search
None
See application file for complete search history.

(56) References Cited

U.S. PATENT DOCUMENTS

| | | | | |
|---|---|---|---|---|
| 1,793,221 | A * | 2/1931 | Iversen | F16D 11/10 |
| | | | | 192/69.81 |
| 2,011,822 | A * | 8/1935 | Munschauer | F16D 11/10 |
| | | | | 192/55.3 |
| 2,351,996 | A * | 6/1944 | Morgan | F16D 41/22 |
| | | | | 192/54.5 |
| 2,760,736 | A | 8/1956 | Mihalko et al. | |
| 2,942,481 | A * | 6/1960 | Gilbert | F16D 43/2024 |
| | | | | 74/7 C |
| 4,271,941 | A * | 6/1981 | Miller | F16D 41/22 |
| | | | | 192/35 |
| 4,805,486 | A * | 2/1989 | Hagiwara | F16H 48/08 |
| | | | | 475/150 |
| 6,131,717 | A | 10/2000 | Owen | |

(Continued)

OTHER PUBLICATIONS

USPTO, Notice of Allowance dated Oct. 6, 2020 in U.S. Appl. No. 16/506,039.

*Primary Examiner* — Timothy Hannon
(74) *Attorney, Agent, or Firm* — Snell & Wilmer L.L.P.

(57) ABSTRACT

A brake roller may comprise a brake shaft and a brake stack assembly located around the brake shaft. A one-way jaw clutch assembly may be configured to apply a force to the brake stack. A roller shell may be located radially outward of the brake stack. The one-way jaw clutch assembly may be configured to vary the force applied to the brake stack in response to a rotation of the roller shell in a circumferential direction.

5 Claims, 9 Drawing Sheets

(56) References Cited

U.S. PATENT DOCUMENTS

| | | | |
|---|---|---|---|
| 6,170,243 B1 | 1/2001 | Hauser | |
| 6,336,542 B1 | 1/2002 | Mintonye, II | |
| 6,868,961 B2 | 3/2005 | Ehlert et al. | |
| 7,021,456 B2 | 4/2006 | Haan et al. | |
| 9,528,578 B2* | 12/2016 | Perabo | F16H 35/10 |
| 2005/0133330 A1* | 6/2005 | Stiefvater | F16D 7/044 |
| | | | 192/55.1 |
| 2016/0053832 A1* | 2/2016 | Bates | F16D 41/185 |
| | | | 192/46 |
| 2017/0341467 A1 | 11/2017 | Seear | |

* cited by examiner

BRAKE ROLLER WITH ONE WAY JAW CLUTCH

CROSS REFERENCE TO RELATED APPLICATIONS

This application is a divisional of, and claims priority to, U.S. patent application Ser. No. 16/506,039, filed Jul. 9, 2019 and titled "BRAKE ROLLER WITH ONE WAY JAW CLUTCH" (the '039 Application). The '039 Application claims the benefit of India Patent Application No. 201941019743, filed May 20, 2019 and titled "BRAKE ROLLER WITH ONE WAY JAW CLUTCH" (the '743 Application). The '039 Application and the '743 Application are incorporated herein by reference in their entirety for all purposes.

FIELD

The present disclosure relates generally to cargo management systems, and more specifically, to a brake roller having a one-way jaw clutch.

BACKGROUND

Cargo handling systems, such as those used by aircraft for transport of containerized cargo or pallets, also referred to as unit load devices (ULDs), typically include roller trays containing transport rollers positioned along a cargo bay floor to facilitate movement of the ULDs relative to the bay floor. Brake rollers are located at various locations in the cargo compartment to provide a braking/resistance and prevent unintended movement of ULDs.

Current brake rollers are generally configured to apply a fixed braking force. The fixed force can be difficult to achieve and tends to require a skilled person to assemble the brake rollers. In this regard, the braking force may vary unintentionally between brake rollers within the same cargo handling system. Additionally, the constant braking force tends to allow lighter ULDs to skid over the non-rotating brake roller, which can lead to the outer braking rubber layer (i.e., the tire) developing a flat or worn spot.

SUMMARY

A brake roller is disclosed herein. In accordance with various embodiments, the brake roller may comprise a brake shaft and a brake stack assembly located around the brake shaft. A one-way jaw clutch assembly may be configured to apply a force to the brake stack assembly. A roller shell may be located radially outward of the brake stack assembly. The one-way jaw clutch assembly may be configured to vary the force applied to the brake stack assembly in response to a rotation of the roller shell in a circumferential direction.

In various embodiments, the one-way jaw clutch assembly may comprise a jaw plate keyed to the roller shell and a slider configured to translate along the brake shaft. In various embodiments, the jaw plate may comprise a plurality of jaw teeth extending axially toward the slider. The slider may comprise a plurality of slider teeth extending axially toward the jaw plate.

In various embodiments, the one-way jaw clutch assembly may further comprise a guide plate keyed to the brake shaft and a spring located between the guide plate and the slider. In various embodiments, the one-way jaw clutch assembly may further comprise a clip located in a groove defined by the brake shaft.

In various embodiments, an axle shaft may be located radially inward of the brake shaft. A unidirectional roller bearing may be located between the axle shaft and the brake shaft. A ball bearing may be located at an end of the brake roller. A spacer may be located radially between the ball bearing and the axle shaft. In various embodiments, the one-way jaw clutch assembly may be located axially between the brake stack assembly and at least one of the ball bearing or the spacer.

In various embodiments, a nut may be located around a threaded surface of the brake shaft. A nut retainer may be located between the nut and the brake stack assembly. The nut retainer may be keyed to the brake shaft. A lock screw may be located through the nut and the nut retainer.

A roller tray for a cargo handling system is also disclosed herein. In accordance with various embodiments, the roller tray may comprise a first rail, a second rail parallel to the first rail, and a brake roller located between the first rail and the second rail. The brake roller may include a brake shaft, a brake stack assembly located around the brake shaft, a one-way jaw clutch assembly configured to apply a force to the brake stack assembly, and a roller shell located radially outward of the brake stack assembly. The one-way jaw clutch assembly may be configured to vary the force applied to the brake stack assembly in response to a rotation of the roller shell in a circumferential direction.

In various embodiments, the one-way jaw clutch assembly may comprise a jaw plate keyed to the roller shell and a slider configured to translate along the brake shaft. In various embodiments, the jaw plate may comprise a plurality of jaw teeth extending axially toward the slider. The slider may comprise a plurality of slider teeth extending axially toward the jaw plate.

In various embodiments, the one-way jaw clutch assembly may further comprise a guide plate keyed to the brake shaft and a spring located between the guide plate and the slider. In various embodiments, the slider may include an axially extending post, the guide plate may define a post groove, and the axially extending post may be located in the post groove.

In various embodiments, the brake roller may further comprise an axle shaft located radially inward of the brake shaft, a unidirectional roller bearing located between the axle shaft and the brake shaft, a spacer located around the axle shaft, and a ball bearing located radially between the spacer and the brake roller. In various embodiments, the one-way jaw clutch assembly may be located axially between the brake stack assembly and at least one of the ball bearing or the spacer.

In various embodiments, the brake roller may further comprise a nut located around a threaded surface of the brake shaft, a nut retainer located between the nut and the brake stack assembly, and a lock screw located through the nut and the nut retainer. The nut retainer may be keyed to the brake shaft.

A one-way jaw clutch assembly for a brake roller is also disclosed herein. In accordance with various embodiments, the one-way jaw clutch assembly may comprise a jaw plate including a radially outward extending protrusion, a slider axially adjacent to the jaw plate, and a guide plate axially adjacent to the slider and including a radially inward extending protrusion.

In various embodiments, the jaw plate may comprise a plurality of jaw teeth extending axially toward the slider, and the slider may comprise a plurality of slider teeth extending axially toward the jaw plate.

In various embodiments, each tooth of the plurality of jaw teeth may comprise a jaw interference surface and an axial surface. The axial surface may extend from the jaw interference surface to a surface of the jaw plate. The jaw interference surface may be normal to the surface of the jaw plate. At least, a portion of the axial surface may be sloped relative to the surface of the jaw plate.

In various embodiments, the slider may include an axially extending post, the guide plate may define a post groove, and the axially extending post may be located in the post groove.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION OF THE DRAWINGS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of a gas turbine engine. As used herein, "forward" refers to the direction associated with the nose (e.g., the front end) of an aircraft, or generally, to the direction of flight or motion.

A first component that is "radially outward" of a second component means that the first component is positioned at a greater distance away from a common axis of the first and second components as compared to the second component. A first component that is "radially inward" of a second component means that the first component is positioned closer to a common axis of the first and second components as compared to the second component.

A brake roller, as disclosed herein, may include a one-way jaw clutch assembly. In accordance with various embodiments, the one-way jaw clutch assembly may be configured to apply a force to a brake stack assembly of the brake roller. When the brake roller is in a braking mode, the one-way jaw clutch assembly may vary the force applied to the brake stack assembly in a cyclic manner.

Figure 1:
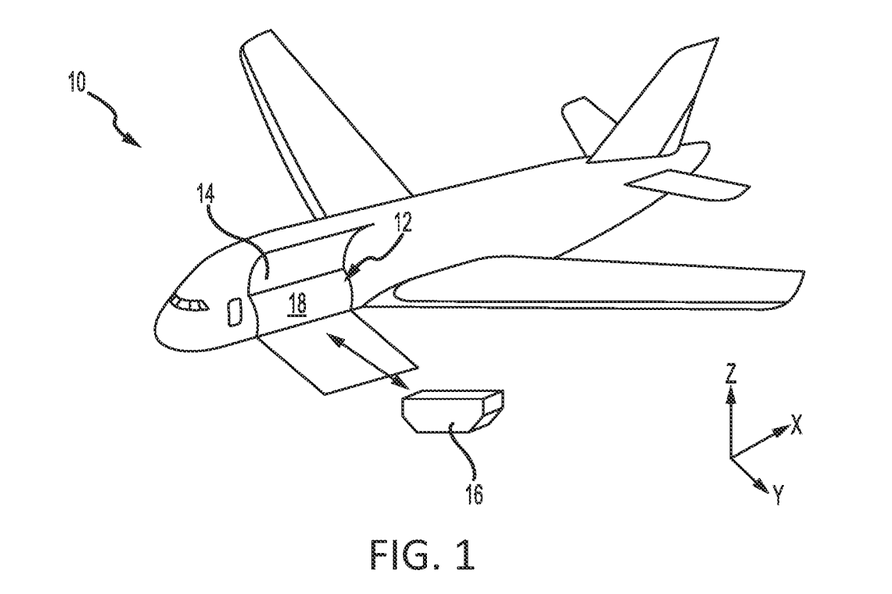
FIG. 1 illustrates an aircraft being loaded with cargo, in accordance with various embodiments.

With reference to FIG. 1, an aircraft 10 is illustrated having a cargo compartment 12. A cargo door 14 provides access to cargo compartment 12 from outside aircraft 10. Cargo 16 (e.g., pallets, ULDs, luggage, etc.) may be loaded and unloaded through cargo door 14 and onto a cargo deck 18 of aircraft 10. In various embodiments, cargo deck 18 may be equipped with one or more power drive units (PDUs) configured to propel cargo 16 across cargo deck 18 in a desired direction.

Figure 2:
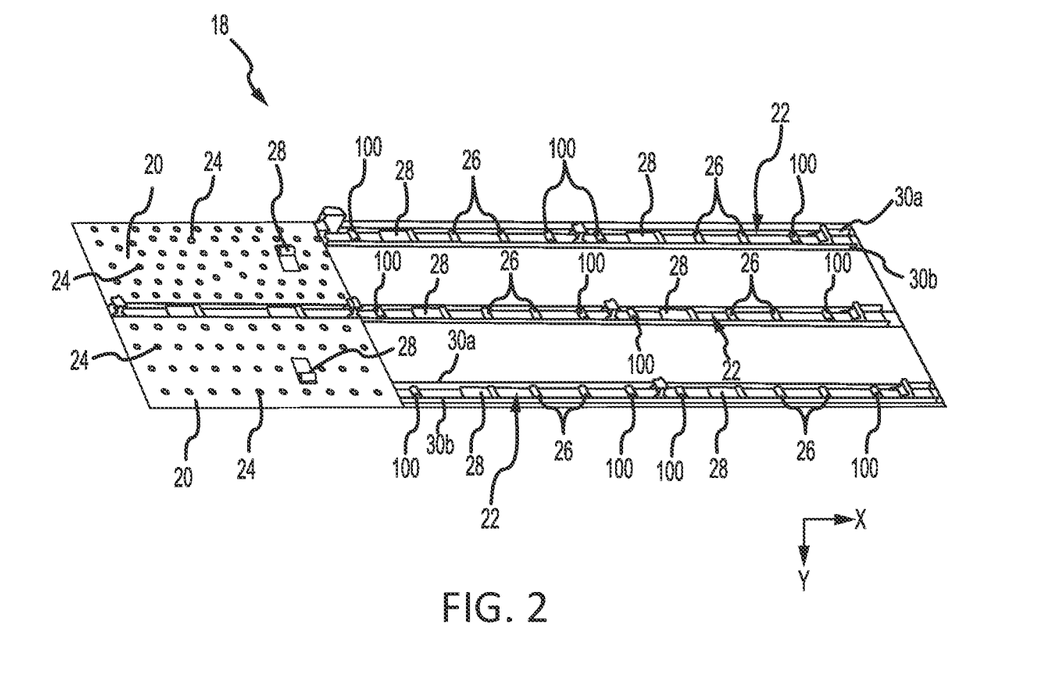
FIG. 2 illustrates a portion of an aircraft cargo deck, in accordance with various embodiments.

With reference to FIG. 2, a portion of cargo deck 18 is illustrated in greater detail. Cargo deck 18 may include one or more ball mats 20 and one or more roller trays 22. Ball mats 20 may include a plurality of freely rotating conveyance balls 24. Roller trays 22 include a plurality of freely rotating conveyance rollers 26. In various embodiments, a number of PDUs 28 may be mounted along cargo deck 18. For example, PDUs 28 may be located in ball mats 20 and/or in roller trays 22. PDUs 28 are configured to propel cargo over conveyance balls 24 and conveyance rollers 26 and across cargo deck 18.

In accordance with various embodiments, a number of brake rollers 100 may be located along cargo deck 18. For example, brake rollers 100 may be mounted in roller trays 22. Brake rollers 100 may be located between a first rail 30a and a second rail 30b of roller tray 22. Second rail 30b may be parallel to first rail 30a. In various embodiments, brake rollers 100 may also be located in ball mats 20. Brake rollers 100 are configured to rotate freely in a first circumferential direction (referred to herein as "normal mode") and restrict rotation in the opposite circumferential direction (referred to herein as "braking mode"). In this regard, when in braking mode, brake rollers 100 may slow or prevent translation of cargo across cargo deck 18 in certain directions. In various embodiments, brake rollers 100 may be configured to slow or prevent cargo from translating in the forward direction.

Figures 3A, 3B:
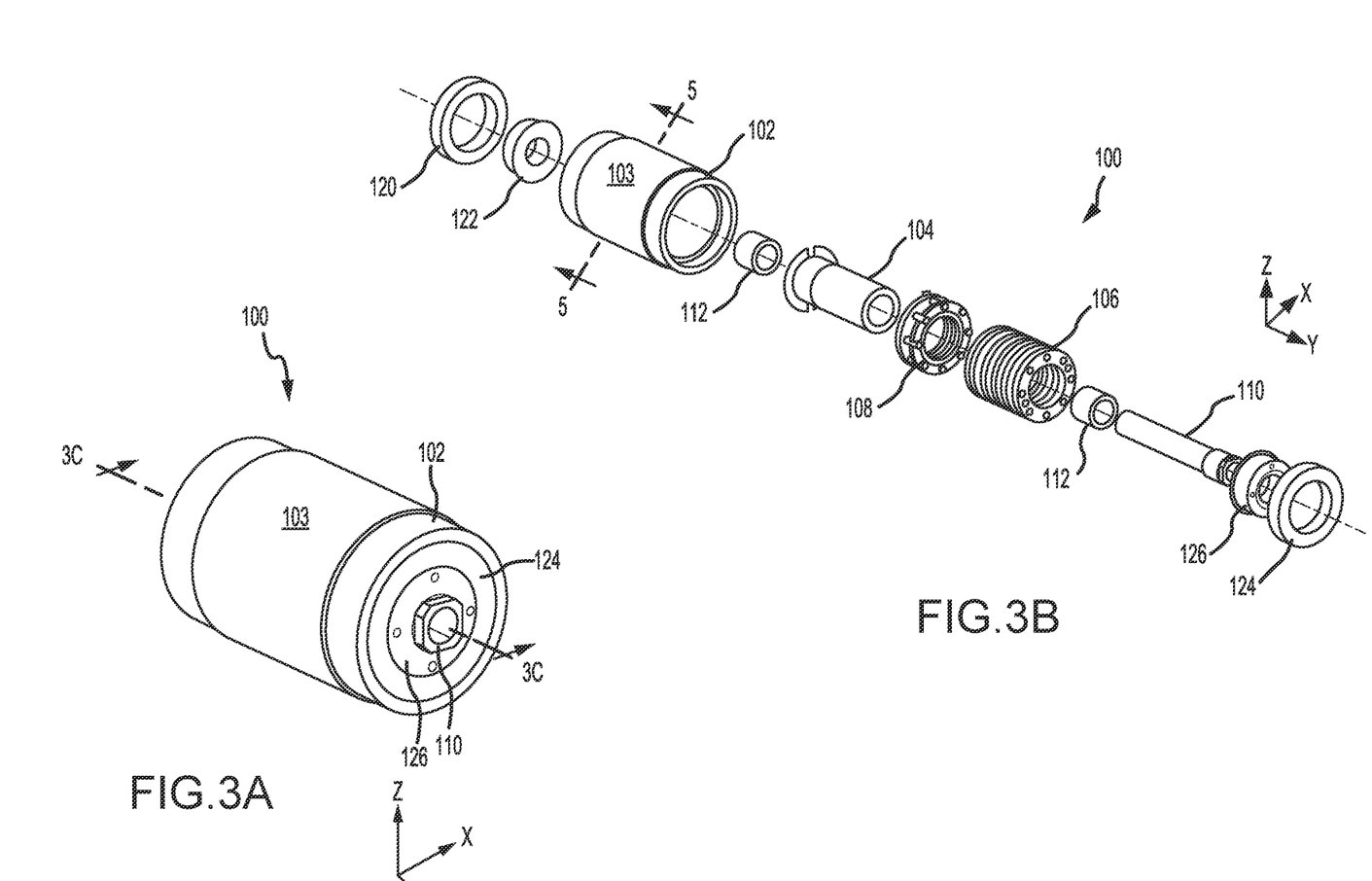
FIG. 3A illustrates a perspective view of a brake roller, in accordance with various embodiments.
FIG. 3B illustrates an exploded view of a brake roller, in accordance with various embodiments.
Figure 3C:
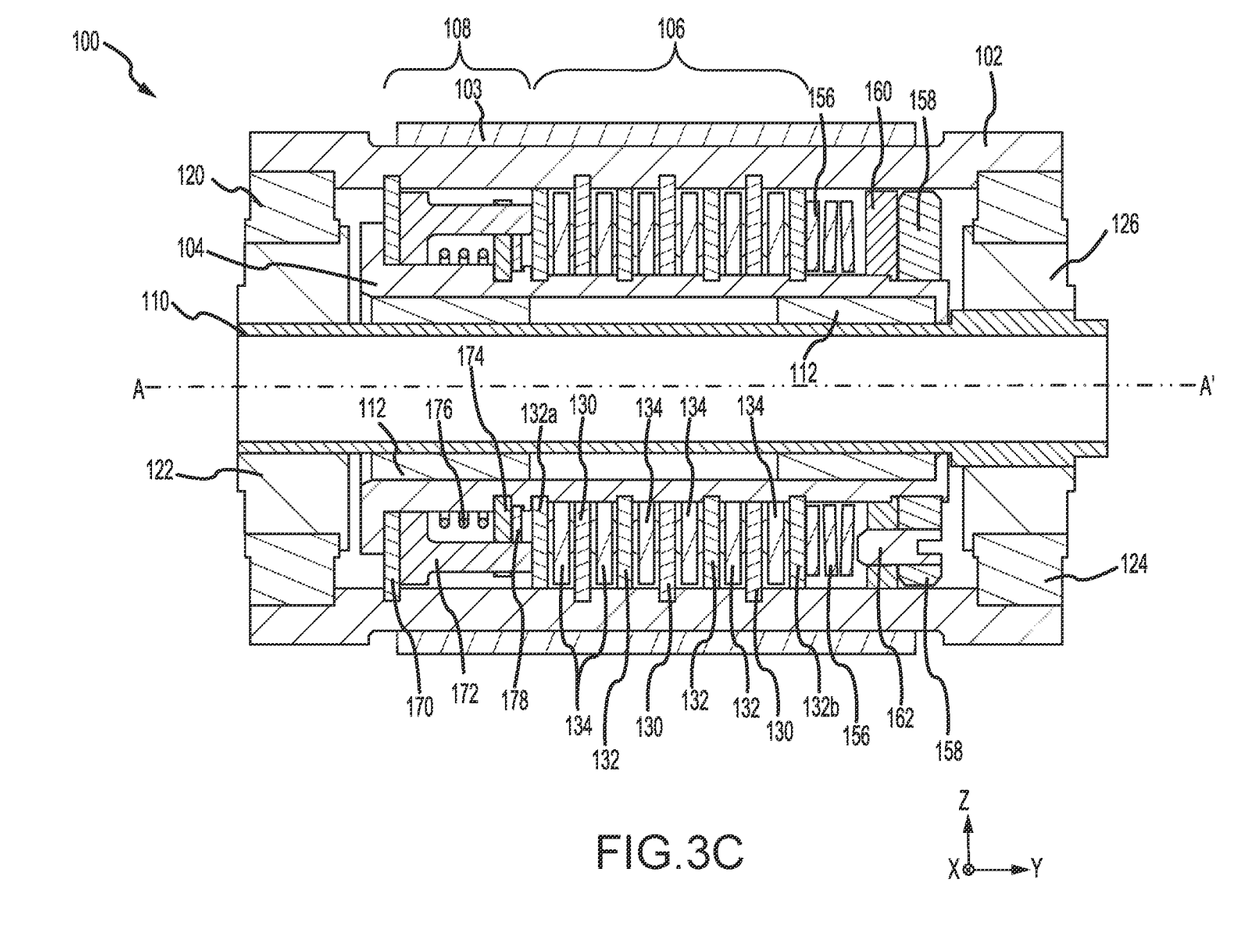
FIG. 3C illustrates a cross-section view of a brake roller taken along the line 3C-3C in FIG. 3A, in accordance with various embodiments.

Referring to FIGS. 3A, 3B, and 3C, a brake roller 100 is illustrated, in accordance with various embodiments. Brake roller 100 includes a roller shell 102 and a tire 103. Tire 103 may be located around roller shell 102. Brake roller 100 further includes a brake shaft 104, a brake stack assembly 106, and a one-way jaw clutch assembly 108. Brake stack assembly 106 and one-way jaw clutch assembly 108 may each be located around brake shaft 104. Stated differently, brake shaft 104 is radially inward of brake stack assembly 106 and one-way jaw clutch assembly 108.

An axle shaft 110 may be located through and radially inward of brake shaft 104. In various embodiments, axle shaft 110 comprises a hollow shaft. Brake roller 100 may be coupled to roller trays 22 via an axle located through axle shaft 110. For example, the axle may be coupled to opposing first and second rails 30a, 30b of roller trays 22, with momentary reference to FIG. 2.

Brake roller 100 further includes one or more unidirectional roller bearings 112. Unidirectional roller bearings 112 are located radially between axle shaft 110 and brake shaft 104. Unidirectional roller bearings 112 allow brake shaft 104 to rotate about axis A-A' in a first circumferential direction 114, with momentary reference to FIG. 8A, and prevent brake shaft 104 from rotating about axis A-A' in a second (i.e., opposite) circumferential direction 116, with momentary reference to FIG. 9A. As used herein, "axial" and "axially" refer to directions parallel to axis A-A', "radially" and "radially" refer to directions normal to axis A-A', and "circumferential" and "circumferentially" refer to directions about axis A-A'.

A first ball bearing 120 and a first spacer 122 are located at a first end of brake roller 100. First spacer 122 is located radially between axle shaft 110 and first ball bearing 120. First ball bearing 120 is located radially between first spacer 122 and roller shell 102. A second ball bearing 124 and a second spacer 126 are located at a second, axially opposite end of brake roller 100. Second spacer 126 is located radially between axle shaft 110 and second ball bearing 124. Second ball bearing 124 is located radially between second spacer 126 and roller shell 102.

Figures 4, 5:
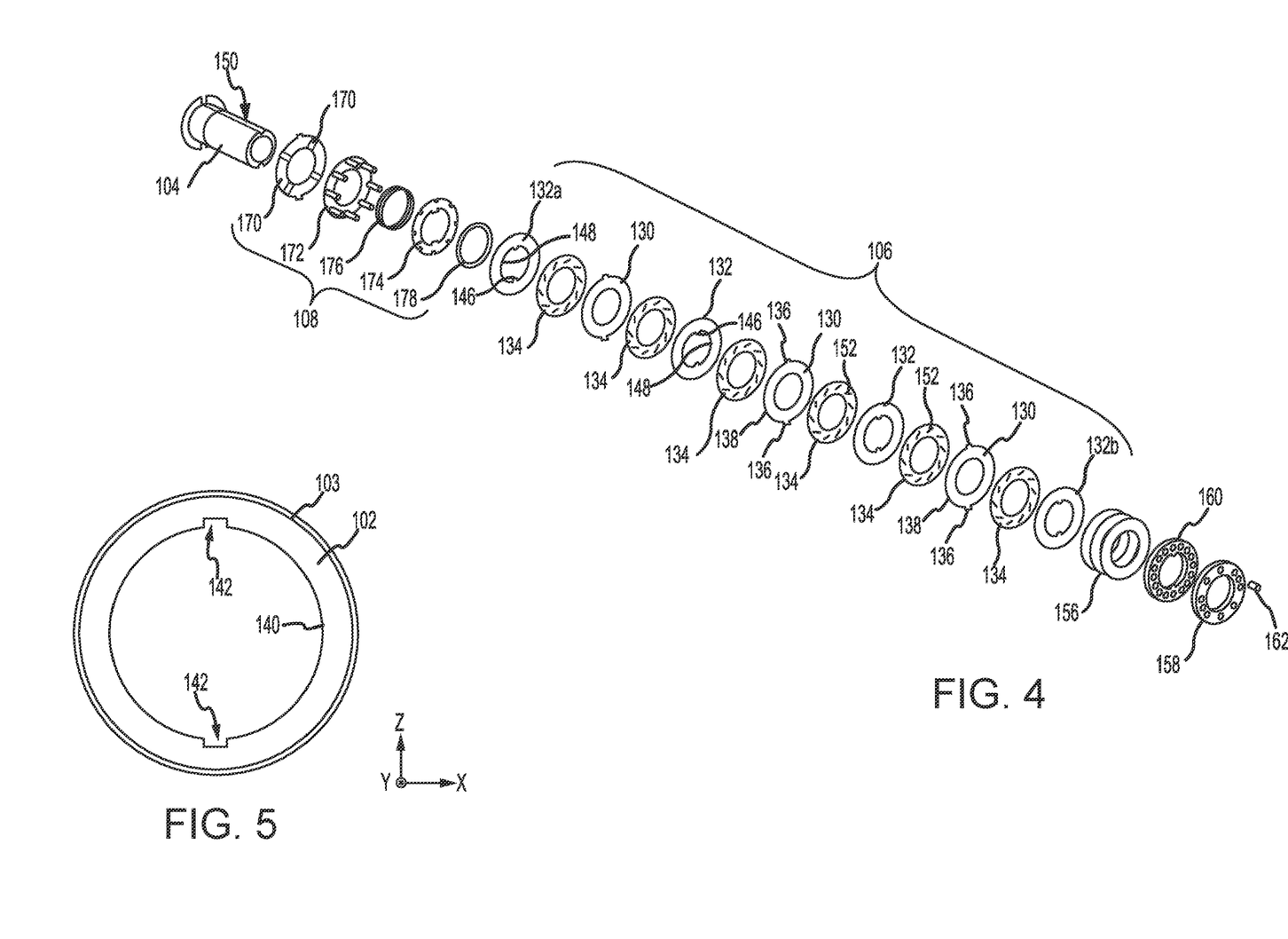
FIG. 4 illustrates an exploded view of a brake stack assembly and a one-way jaw clutch assembly of a brake roller, in accordance with various embodiments.
FIG. 5 illustrates a cross-section view of a roller shell of a brake roller taken along the line 5-5 in FIG. 3B, in accordance with various embodiments.

With reference to FIG. 4, and exploded view of brake stack assembly 106 and one-way jaw clutch assembly 108 is illustrated, in accordance with various embodiments. Brake stack assembly 106 includes a plurality of outer brake plates 130, inner brake plates 132, and roller plates 134. Outer brake plates 130 are interleaved between inner brake plates 132 with roller plates 134 located between adjacent outer and inner brake plates 130, 132.

Outer brake plates 130 are keyed to roller shell 102 (FIG. 3B). Stated differently, outer brake plates 130 are rotationally coupled to roller shell 102. In various embodiments, outer brake plates 130 include one or more outer circumference protrusions 136. Protrusions 136 extend radially outward from an outer circumference 138 of outer brake plate 130.

FIG. 5 illustrates a cross-section of roller shell 102 taken along the line 5-5 in FIG. 3B. With combined reference to FIG. 4 and FIG. 5, an inner circumference 140 of roller shell 102 defines one or more outer plate groove(s) 142. Outer plate groove(s) 142 is/are configured to receive radially outward extending protrusions 136 of outer brake plates 130.

Returning to FIG. 4, inner brake plates 132 are keyed to brake shaft 104. Stated differently, inner brake plates 132 are rotationally coupled to brake shaft 104. In various embodiments, inner brake plates 132 include one or more inner circumference protrusions 146. Protrusions 146 extend radially inward from an inner circumference 148 of inner brake plate 132. Brake shaft 104 defines one or more inner plate groove(s) 150. Inner plate groove(s) 150 is/are configured to receive radially inward extending protrusions 146 of inner brake plates 132.

Roller plates 134 are located between adjacent outer and inner brake plates 130, 132. Roller plates 134 include rollers 152. Rollers 152 may be located in orifices, or "cages", defined by roller plates 134. Rollers 152 are located circumferentially about roller plates 134. The rotation of roller shell 102 is transferred via outer brake plates 130 to rollers 152. During braking mode, axial force is applied to brake stack assembly 106 by one-way jaw clutch assembly 108, thereby compressing inner brake plates 132, outer brake plates 130, and roller plates 134 together. The axial force and compression of outer brake plates 130, roller shell 102, and inner brake plates 132 reduces the speed of rotation of rollers 152, which in turn reduces the speed of rotation of outer brake plates 130 and roller shell 102.

Brake roller 100 may further include one or more Belleville springs 156, a nut 158, a nut retainer 160, and a lock screw 162. Referring to FIG. 3C, Belleville springs 156 may be located axially between nut retainer 160 and a second end inner plate 132b of brake stack assembly 106. Second end inner plate 132b is located at the end of brake stack assembly 106 that is opposite one-way jaw clutch assembly 108.

Figure 6A:
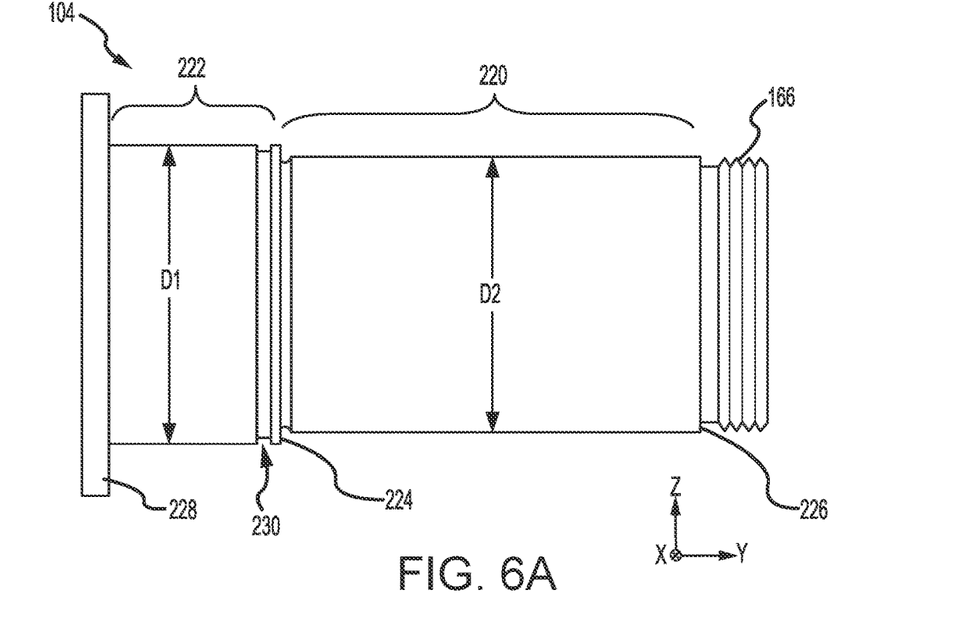
FIG. 6A illustrates a side view of a brake shaft of a brake roller, in accordance with various embodiments.
Figure 6B:
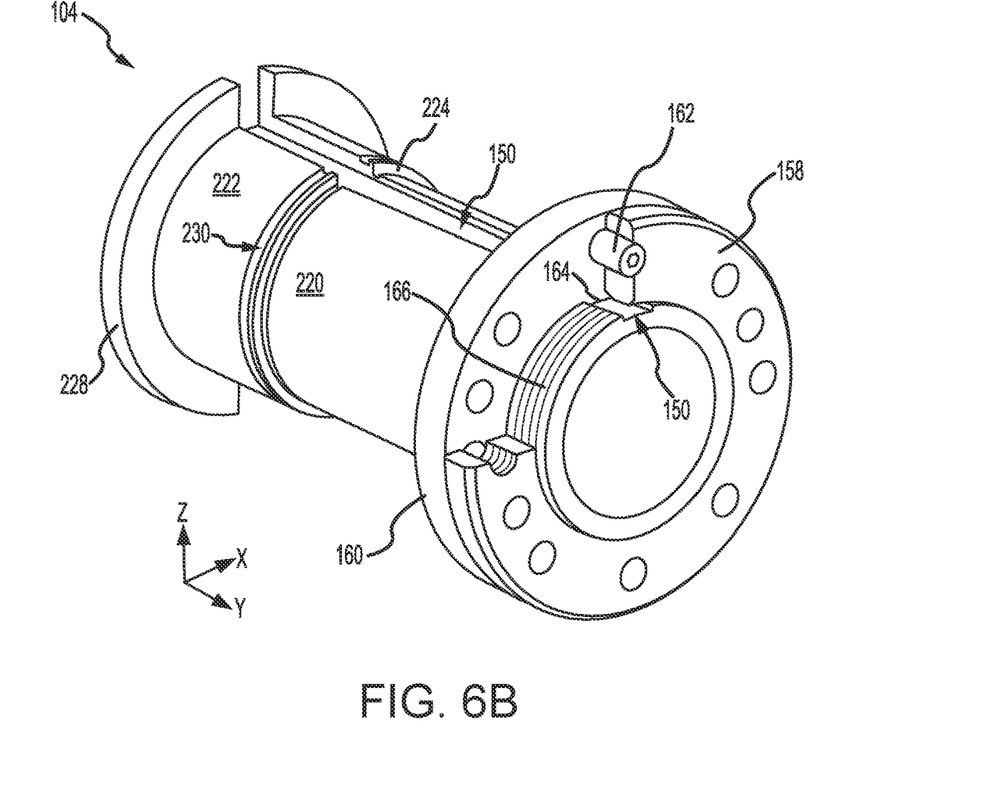
FIG. 6B illustrates a perspective cut-away view of a nut coupled to the brake shaft of a brake roller, in accordance with various embodiments.

Referring to FIG. 6B, and with continued reference to FIG. 5, nut retainer 160 may include one or more inner circumference nut protrusion(s) 164. Nut protrusions 164 extend radially inward from an inner circumference of nut retainer 160. Nut protrusions 164 are received by inner plate groove 150 of brake shaft 104. Locating nut protrusion 164 in inner plate groove 150 generates an interference which prevents or blocks rotation of nut retainer 160 relative to brake shaft 104. Nut 158 may engage a threaded surface 166 of brake shaft 104. A lock screw 162 may be located through and/or engage nut 158 and nut retainer 160. Lock screw 162 couples nut 158 to nut retainer 160. In this regard, the interference generated by nut protrusion 164 may block rotation of nut 158 about threaded surface 166.

Figure 7A:
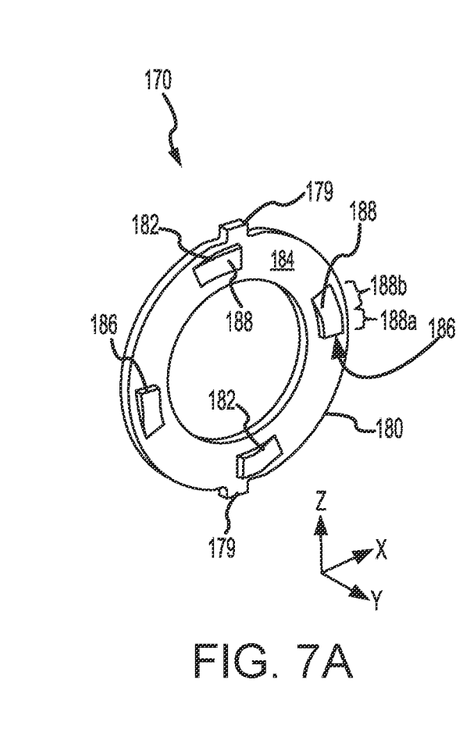
FIGS. 7A, 7B, and 7C illustrate components of a one-way jaw clutch assembly of a brake roller, in accordance with various embodiments.

Returning to FIG. 4, one-way jaw clutch assembly includes a jaw plate 170, a slider 172, a guide plate 174, a spring 176, and a clip 178. With reference to FIG. 7A, and continuing reference to FIG. 5, jaw plate 170 is illustrated, in accordance with various embodiments. Jaw plate 170 includes one or more outer circumference jaw protrusion(s) 179. Jaw protrusions 179 extend radially outward from an outer circumference 180 of jaw plate 170. Jaw protrusions 179 may be located in outer plate groove 142 of roller shell 102, with momentary reference to FIG. 5.

Jaw plate 170 also includes axially extending jaw teeth 182. Jaw teeth 182 extend axially from a surface 184 of jaw plate 170. Surface 184 is oriented toward slider 172. In this regard, jaw teeth 182 extend toward slider 172. Jaw teeth 182 may be defined, at least partially, by a jaw interference surface 186 and an axial surface 188. Jaw interference surface 186 may be approximately normal to surface 184 of jaw plate 170. As used in the previous context, "approximately" means ±3°. Axial surface 188 extends from jaw interference surface 186 to surface 184 of jaw plate 170. In various embodiments, a first portion 188a of axial surface 188 may be parallel to surface 184 of jaw plate 170. First portion 188a may extend from jaw interference surface 186. In various embodiments, a second portion 188b of axial surface 188 may be sloped, or non-parallel, relative to surface 184 of jaw plate 170. Second portion 188b may extend from first portion 188a of axial surface 188 to surface 184 of jaw plate 170.

Figure 7B:
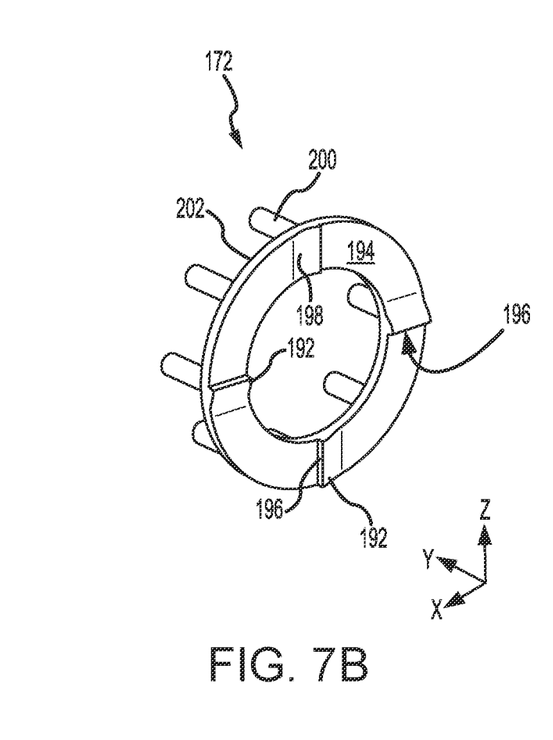

With reference to FIG. 7B, and continuing reference to FIG. 5, slider 172 of one-way jaw clutch assembly 108 is illustrated, in accordance with various embodiments. Slider 172 includes axially extending slider teeth 192. Slider teeth 192 extend axially from a first surface 194 of slider 172. First surface 194 is oriented toward jaw plate 170. In this regard, slider teeth 192 extend toward jaw plate 170. Slider teeth 192 may be defined, at least partially, by a slider interference surface 196 and an axial surface 198. Slider interference surface 196 may be approximately normal to first surface 194 of slider 172. As used in the previous context, "approximately" means ±3°. Axial surface 198 extends from slider interference surface 196 to first surface 194 of slider 172. In various embodiments, at least, a portion of axial surface 198 may be sloped, or non-parallel to first surface 194 of slider 172. In various embodiments, a portion of axial surface 198 may be parallel to first surface 194 of slider 172.

In accordance with various embodiments, jaw teeth 182 and slider teeth 192 are configured such that jaw interference surfaces 186 are oriented toward slider interference surfaces 196.

Slider 172 further includes axially extending posts 200. Posts 200 extend axially from a second surface 202 of slider 172. Second surface 202 is oriented away from jaw plate 170. Thus, second surface 202 is opposite first surface 194 of slider 172. In this regard, posts 200 extend axially away from jaw plate 170 and toward guide plate 174 and brake stack assembly 106.

Figure 7C:
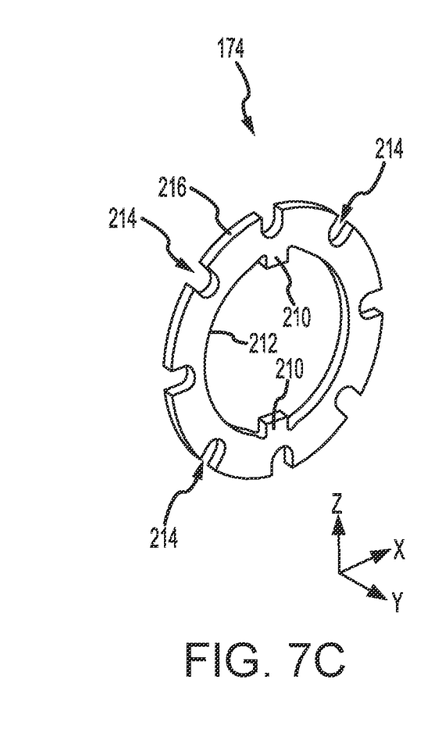

With reference to FIG. 7C, and continuing reference to FIG. 5, guide plate 174 of one-way jaw clutch assembly 108 is illustrated, in accordance with various embodiments. Guide plate 174 includes one or more inner circumference guide protrusion(s) 210. Guide protrusions 210 extend radially inward from an inner circumference 212 of guide plate 174. Guide protrusions 210 may be located in inner plate grooves 150 of brake shaft 104, with momentary reference to FIG. 6B. Locating guide protrusions 210 in inner plate grooves 150 generates an interference between guide plate 174 and brake shaft 104. The interference causes guide plate 174 to rotate with brake shaft 104 and/or prevents guide plate 174 from rotating relative to brake shaft 104. For example, the interference between guide protrusions 210 and brake shaft 104 prevents guide plate 174 from rotating during braking mode. In this regard, guide plate 174 may be configured to rotate with brake shaft 104 in first circumferential direction 114, with momentary reference to FIG. 8A, and may be prevented from rotating in second circumferential direction 116, with momentary reference to FIG. 9A.

Guide plate 174 defines one or more post grooves 214. Post grooves 214 are formed in an outer circumference 216 of guide plate 174. Post grooves 214 are configured to receive posts 200 of slider 172.

With combined reference to FIG. 3C and FIG. 4, spring 176 of one-way jaw clutch assembly 108 is located between slider 172 and guide plate 174. Spring 176 applies a biasing force against slider 172. In various embodiments, spring 176 is a coil spring. Clip 178 of one-way jaw clutch assembly 108 is located between guide plate 174 and a first end inner brake plate 132a of brake stack assembly 106. First end inner brake plate 132a is located at the end of brake stack assembly 106 that is proximate one-way jaw clutch assembly 108. Clip 178 is located proximate a first surface of guide plate 174, such that clip 178 is located between guide plate 174 and first end inner brake plate 132a. Spring 176 is located between an opposing second surface of guide plate 174 and second surface 202 of slider 172, with momentary reference to FIG. 7B. In various embodiments, clip 178 may be a circlip, also referred to as a C-clip or a snap-ring.

Referring to FIG. 6A, a side view of brake shaft 104 is illustrated, in accordance with various embodiments. Brake shaft 104 includes a brake stack portion 220 and a clutch portion 222. With combined reference to FIG. 6A and FIG. 3C, brake stack assembly 106 may be located on and around brake stack portion 220 of brake shaft 104. One-way jaw clutch assembly 108 may be located on and around clutch portion 222 of brake shaft 104. In various embodiments, a diameter D1 of clutch portion 222 may be greater than a diameter D2 of brake stack portion 220.

Brake shaft 104 may include a step 224 between brake stack portion 220 and clutch portion 222. Step 224 is configured to generate an interference with first end inner brake plate 132a. The interference between step 224 and first end inner brake plate 132a limits translation of brake stack assembly 106 toward one-way jaw clutch assembly 108.

Brake shaft 104 may include a step 226 between brake stack portion 220 and threaded surface 166. Step 226 is configured to generate an interference with nut 158 or with nut retainer 160. The interference between step 226 and nut 158 or nut retainer 160 limits translation of nut 158 toward brake stack assembly 106.

Brake shaft 104 may include a flange 228. Flange 228 may be located at an end of brake shaft 104 that is opposite threaded surface 166. Flange 228 is configured to generate an interference with jaw plate 170 of one-way jaw clutch assembly 108. The interference between flange 228 and jaw plate 170 limits translation of one-way jaw clutch assembly 108 away from brake stack assembly 106. In various embodiments, a clip groove 230 may be formed in brake shaft 104. In various embodiments, clutch portion 222 of brake shaft 104 may define clip groove 230. Clip groove 230 is configured to receive clip 178 of one-way jaw clutch assembly 108. Locating clip 178 in clip groove 230 limits translation of guide plate 174 toward brake stack assembly 106.

Figure 8A:
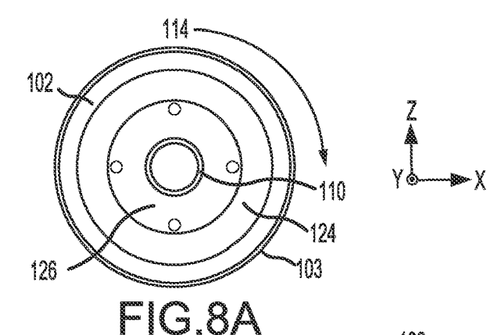
FIGS. 8A, 8B, and 8C illustrate a brake roller in a normal, non-braking mode, in accordance with various embodiments.

Referring to FIG. 8A, a side (or axial) view of brake roller 100 in normal mode is illustrated, in accordance with various embodiments. In normal mode, brake roller 100 rotates in first circumferential direction 114. In various embodiments, first circumferential direction 114 corresponds to cargo translating in an aftward direction.

Figure 8B:
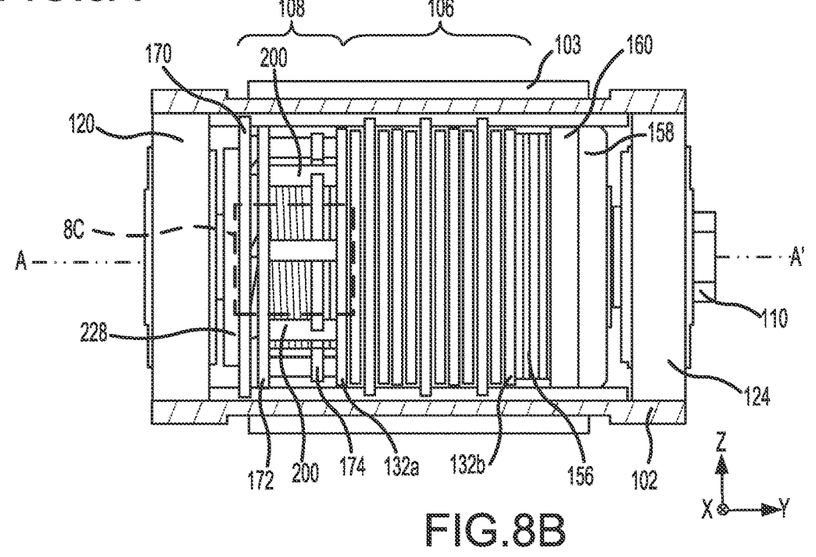

FIG. 8B illustrates brake roller 100 in normal mode, with a portion of roller shell 102 and tire 103 cut-away to illustrate brake stack assembly 106 and one-way jaw clutch assembly 108. With combined reference to FIGS. 8A and 8B, in normal mode (i.e., when brake roller 100 is rotating in first circumferential direction 114), roller shell 102 and brake shaft 104 rotate freely in first circumferential direction 114 and about axis A-A'. For example, rotational motion is transferred from roller shell 102 to brake shaft 104 via outer brake plates 130, roller plates 134, and inner brake plates 132. Guide plate 174 is keyed to and rotates with brake shaft 104. The interference between guide protrusions 210 and inner plate groove 150 of brake shaft 104 rotationally couples guide plate 174 and brake shaft 104.

Figure 8C:
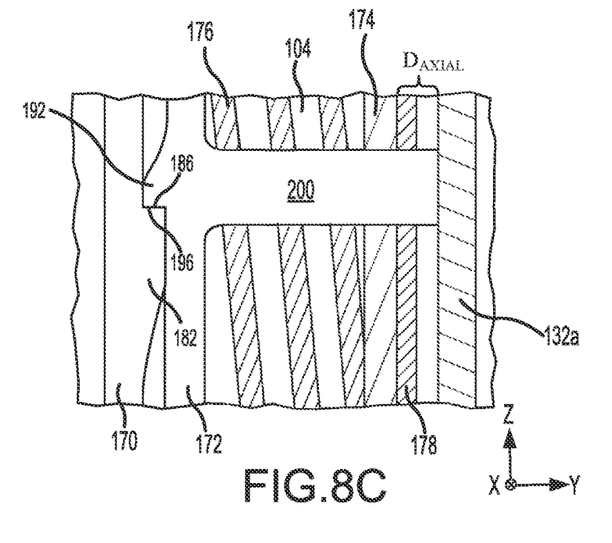

Referring to FIG. 8C, a portion of one-way jaw clutch assembly 108 located in box 8C in FIG. 8B is illustrated during normal mode. In accordance with various embodiments, during normal mode, jaw interference surface 186 of jaw teeth 182 contacts slider interference surface 196 of slider teeth 192. The interference between jaw teeth 182 and slider teeth 192 cause slider 172 to rotate in first circumferential direction 114 (FIG. 8A). In various embodiments, interference between posts 200 and post grooves 214 may also cause slider 172 to rotate in first circumferential direction 114. In normal mode, an axial distance $D_{AXIAL}$ between guide plate 174 and first end inner brake plate 132a is at a minimum. With momentary combined reference to FIG. 10 and FIGS. 8A, 8B, and 8C, during normal mode, one-way jaw clutch assembly 108 (i.e., slider 172) applies a minimum braking force 250 to brake stack assembly 106.

Figure 9A:
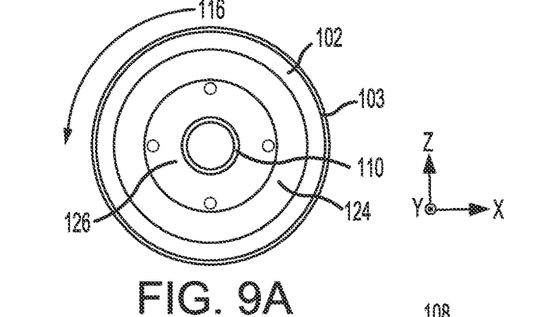
FIGS. 9A, 9B, and 9C illustrate a brake roller in a braking mode, in accordance with various embodiments.

Referring to FIG. 9A, a side (or axial) view of brake roller 100 in braking mode is illustrated, in accordance with various embodiments. In braking mode, a force tending to cause brake roller 100 to rotate in second circumferential direction 116 is applied to tire 103 and roller shell 102. In various embodiments, second circumferential direction 116 corresponds to cargo translating in a forward direction.

Figure 9B:
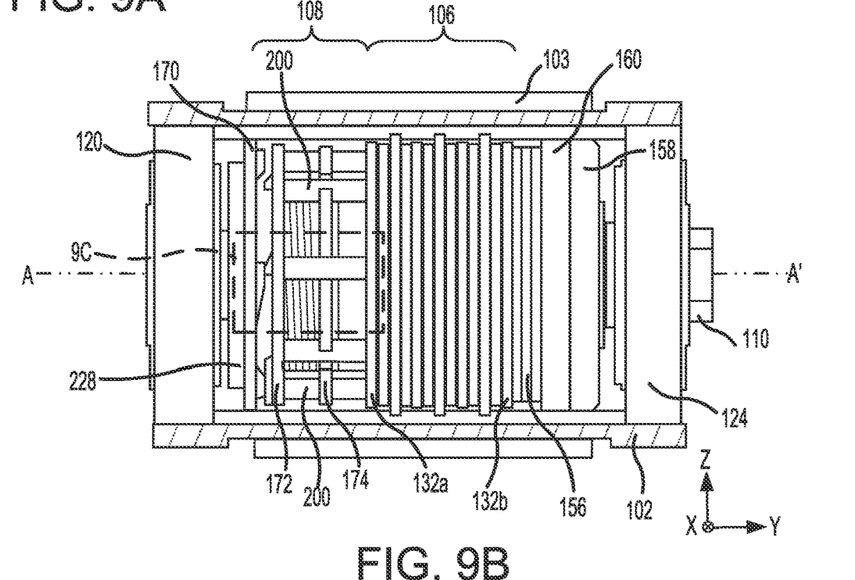

FIG. 9B illustrates brake roller 100 in braking mode, with a portion of roller shell 102 and tire 103 cut-away to illustrate brake stack assembly 106 and one-way jaw clutch assembly 108. With combined reference to FIGS. 9A and 9B, roller shell 102 rotates in second circumferential direction 116 and about axis A-A'. Unidirectional roller bearings 112 (FIG. 3C) prevent or reduce rotation of brake shaft 104 and inner brake plates 132 (which are keyed (i.e., rotationally coupled) to brake shaft 104) in second circumferential direction 116.

Guide plate 174 is also keyed to brake shaft 104 and this thus blocked from rotating in second circumferential direction 116. Posts 200 located in post grooves 214 block slider 172 from rotating in second circumferential direction 116. Jaw plate 170 is keyed (i.e., rotationally coupled) to and rotates with roller shell 102 in second circumferential direction 116.

Figure 9C:
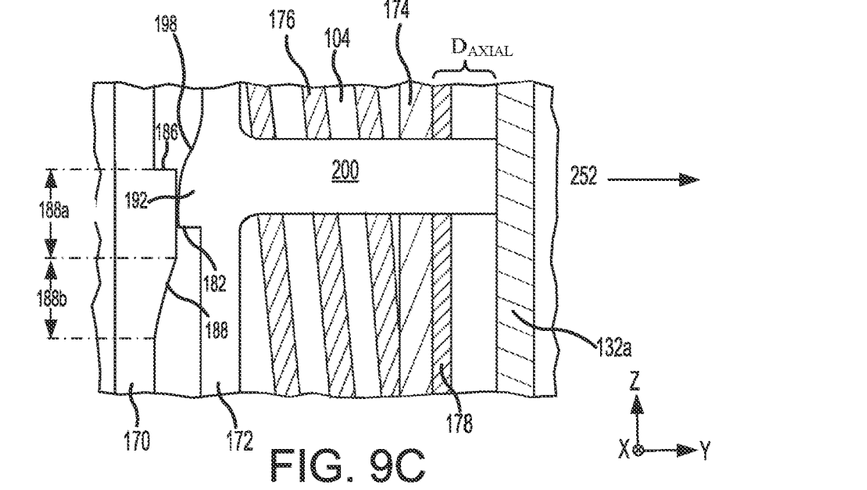

In FIG. 9C, a portion of one-way jaw clutch assembly 108 located in box 9C in FIG. 9B is illustrated during braking mode. In accordance with various embodiments, in braking mode, jaw plate 170 rotates in second circumferential direction 116 while slider 172 remains relatively stationary. As jaw plate 170 rotates in second circumferential direction 116, jaw teeth 182 translate over slider teeth 192, thereby causing slider 172 to translate axially towards first end inner brake plate 132a (i.e., in the direction of arrow 252). As slider 172 translates towards first end inner brake plate 132a, the force applied to brake stack assembly 106 increases, which compresses outer brake plates 130, roller plates 134, and inner brake plates 132 together to reduce the rotation speed of roller shell 102. As slider 172 translates towards first end inner brake plate 132a, the force applied to brake stack assembly 106 increases, which decelerates roller shell 102. Clip 178 blocks translation of guide plate 174, such that as slider 172 translates towards first end inner brake plate 132a, distance $D_{AXIAL}$ between guide plate 174 and first end inner brake plate 132a increases.

In normal mode, jaw plate 170 and guide plate 174 rotate, thereby causing slider 172 to rotate, with minimum to no axial translation of slider 172. In braking mode, guide plate 174 remains stationary and jaw plate 170 rotates, thereby causing jaw teeth 182 to override slider teeth 192 and push slider teeth 192 and posts 200 towards brake stack assembly 106. In various embodiments, the slope of axial surface 198 of slider teeth 192 may reduce friction between jaw teeth 182 and slider teeth 192. Translation of slider 172 towards brake stack assembly 106 compresses spring 176 between second surface 202 of slider 172 and guide plate 174. As jaw plate 170 continues rotating, jaw teeth 182 rotate past (i.e., no longer override) slider teeth 192. When jaw teeth 182 are no longer overriding (i.e., are not circumferentially aligned with) slider teeth 192, spring 176 biases slider 172 away from brake stack assembly 106. Clip 178 limits translation of guide plate 174, thereby blocking guide plate 174 from translating towards brake stack assembly 106 when spring 176 is being compressed. The translation of slider 172 toward and away from brake stack assembly 106 continues in a cyclic manner as jaw plate 170 rotates with roller shell 102.

With combined reference to FIG. 10 and FIGS. 9A, 9B, and 9C, during braking mode, one-way jaw clutch assembly 108 (i.e., slider 172) applies a varying braking force 256 to brake stack assembly 106. Braking force 256 varies between minimum braking force 250, which is applied when jaw teeth 182 are not overriding slider teeth 192, and maximum braking force 258, which is applied when distance $D_{AXIAL}$ is at a maximum distance. In various embodiments, maximum braking force 258 is applied when first portions 188a of jaw teeth 182 are contacting axial surface 188 of slider teeth 192 proximate slider interference surface 196. Stated differently, maximum braking force 258 is applied when the portions of jaw teeth 182 having the greatest axial length are axially alight with the portions of slider teeth 192 having the greatest axial length.

Figure 10:
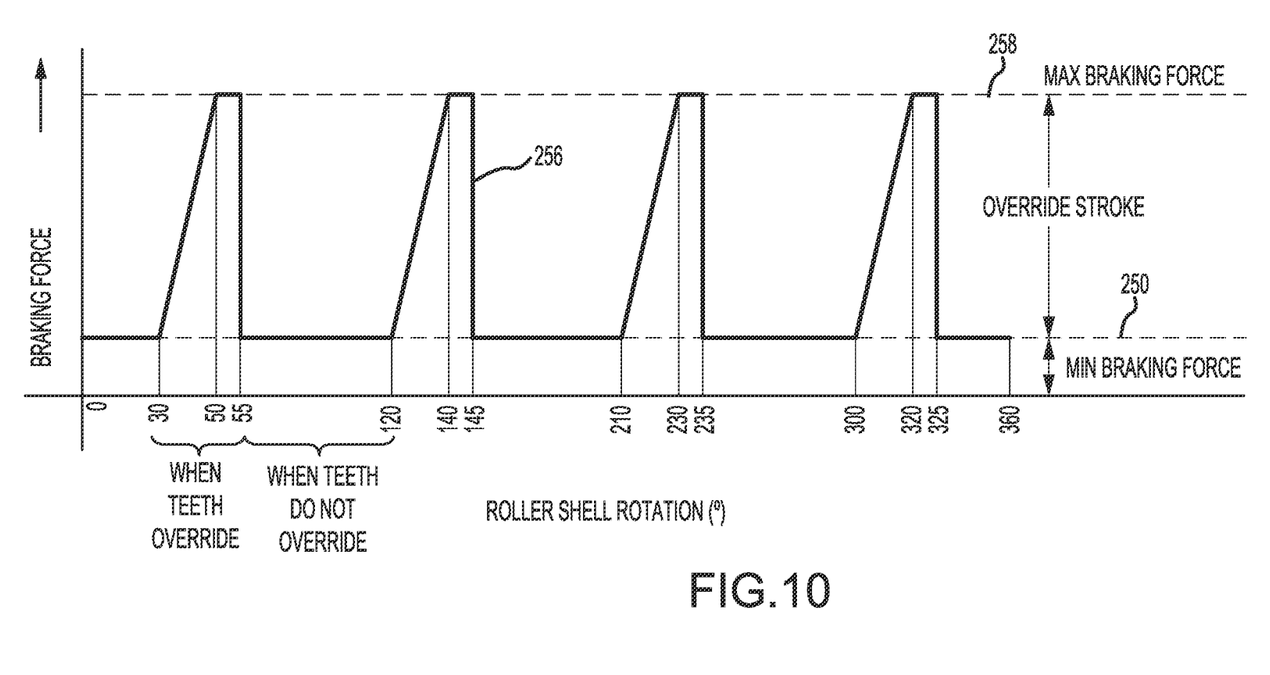
FIG. 10 illustrates a graphical representation of braking force applied during rotation of a brake roller, in accordance with various embodiments.

Sloped second portion 188b of jaw teeth 182 and/or sloped axial surface 198 of slider teeth 192 may cause braking force 256 to increase in a relatively smooth manner. Sloped second portion 188b of jaw teeth 182 and/or sloped axial surface 198 of slider teeth 192 may facilitate translation of jaw teeth 182 over slider teeth 192. As jaw plate 170 continues rotating, braking force 256 returns to minimum braking force 250 as jaw teeth 182 rotate past and no longer override slider teeth 192. Stated differently, one-way jaw clutch assembly 108 applies minimum braking force 250 to brake stack assembly 106 when no portions of jaw teeth 182 are circumferentially aligned with slider teeth 192. Stated yet another way, one-way jaw clutch assembly 108 applies minimum braking force 250 to brake stack assembly 106 when jaw teeth 182 are circumferentially offset from slider teeth 192.

The variance in braking force 256 (i.e., the difference between maximum braking force 258 and minimum braking force 250) corresponds to the distance slider 172 axially translates (i.e., the change in distance $D_{AXIAL}$). In this regard, maximum braking force 258 may be increased by increasing an axial length of jaw interference surface 186 and/or slider interference surface 196. The frequency at which braking force 256 varies (i.e., the number of degrees of rotation of roller shell 102 between teeth override) corresponds to the number of teeth formed on jaw plate 170 and/or slider 172. FIGS. 7A, 7B, and 10 illustrate a one-way jaw clutch assembly 108 having four jaw teeth 182 per jaw plate 170 and four slider teeth 192 per slider 172, such that jaw teeth 182 override slider teeth 192 every 90° of rotation. Adding additional jaw teeth 182 and/or slider teeth 192 reduces the number of degrees between tooth overlap. Reducing the number of jaw teeth 182 and/or slider teeth 192 increases the number of degrees between tooth overlap.

The varying the braking force applied by one-way jaw clutch assembly 108 may achieve faster and/or more effective braking of brake roller 100, thereby causing ULD translation speeds to be retarded at a faster rate. The braking force generated by one-way jaw clutch assembly 108 can be varied by increasing or decreasing the stroke (i.e., axial translation distance) of slider 172. The axial translation distance is varied by adjusting the axial length of jaw teeth 182 and/or of slider teeth 192. The variance in braking force tends to allow brake roller 100 to meet the braking force associated different size ULDs. Brake roller 100 with one-way jaw clutch assembly 108 tends to decrease the time associated with installation and maintenance of brake roller 100. Brake roller 100 with one-way jaw clutch assembly 108 tends to reduce occurrences of ULDs skidding over tire 103, which tends to increase part life of tire 103 and brake roller 100. The size and configuration of one-way jaw clutch assembly 108 allows one-way jaw clutch assembly 108 to be incorporated (i.e., retro-fit) into existing brake rollers. Additionally, a size of brake roller 100 including one-way jaw clutch assembly 108 is similar to the size of traditional brake rollers, such that brake roller 100 including one-way jaw clutch assembly 108 can replace traditional brake rollers.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A one-way jaw clutch assembly for a brake roller, the one-way jaw clutch assembly, comprising:
    a jaw plate including:
        a jaw plate outer circumferential surface, a jaw plate inner circumferential surface, and a first jaw plate surface extending radially between the jaw plate outer circumferential surface and the jaw plate inner circumferential surface;
        a plurality of jaw teeth extending axially from the first jaw plate surface; and
        a jaw protrusion extending radially outward from the jaw plate outer circumferential surface;
    a slider axially adjacent to the jaw plate and including:
        a plurality of slider teeth extending axially from a first slider surface and toward the first jaw plate surface; and
        a plurality of posts extending axially from a second slider surface and away from the first jaw plate surface, the second slider surface being opposite the first slider surface; and
    a guide plate including:
        a guide plate outer circumferential surface, a guide plate inner circumferential surface, and a first guide plate surface extending radially between the guide plate outer circumferential surface and the guide plate inner circumferential surface, the first guide plate surface being oriented toward the second slider surface; and
        a guide protrusion extending radially inward from the guide plate inner circumferential surface, wherein the guide plate defines a plurality of post grooves, and wherein each post of the plurality of posts is located in a post groove of the plurality of post grooves.

2. The one-way jaw clutch assembly of claim 1, wherein each tooth of the plurality of jaw teeth comprises a jaw interference surface and an axial surface, the axial surface extending from the jaw interference surface to the first jaw plate surface, and wherein the jaw interference surface is normal to the first jaw plate surface.

3. The one-way jaw clutch assembly of claim 2, wherein the axial surface comprises a first portion extending from the jaw interference surface and a second portion extending between the first portion and the first jaw plate surface, the first portion being parallel to the first jaw plate surface, the second portion being non-parallel to the first jaw plate surface.

4. The one-way jaw clutch assembly of claim 1, further comprising a spring located between the second slider surface and the first guide plate surface.

5. The one-way jaw clutch assembly of claim 4, further comprising a circ clip located axially adjacent to a second guide plate surface, the second guide plate surface being opposite the first guide plate surface.

* * * * *